United States Patent
Kram

(10) Patent No.: US 11,262,730 B2
(45) Date of Patent: Mar. 1, 2022

(54) CONTROL COMPONENT AND METHOD FOR DETERMINING AN ADAPTED MASTER VALUE OF A MASTER AXIS

(71) Applicant: SIEMENS AKTIENGESELLSCHAFT, Munich (DE)

(72) Inventor: Raimund Kram, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 90 days.

(21) Appl. No.: 16/394,901

(22) Filed: Apr. 25, 2019

(65) Prior Publication Data

US 2019/0332095 A1  Oct. 31, 2019

(30) Foreign Application Priority Data

Apr. 26, 2018 (EP) .................................... 18169487

(51) Int. Cl.
  *G05B 19/414* (2006.01)
  *G06F 13/40* (2006.01)
  *H04J 3/06* (2006.01)

(52) U.S. Cl.
  CPC ..... *G05B 19/4141* (2013.01); *G06F 13/4072* (2013.01); *H04J 3/0638* (2013.01); *G05B 2219/50218* (2013.01)

(58) Field of Classification Search
  CPC ...... G05B 19/4141; G05B 2219/50218; G06F 13/4072; H04J 3/0638
  USPC ......................................................... 318/600
  See application file for complete search history.

(56) References Cited

U.S. PATENT DOCUMENTS

| | | | |
|---|---|---|---|
| 2002/0003416 A1 | 1/2002 | Sagasaki | |
| 2002/0133244 A1 | 9/2002 | Schroeder et al. | |
| 2002/0178292 A1* | 11/2002 | Mushkin | H04L 12/403 |
| | | | 709/248 |
| 2003/0191544 A1 | 10/2003 | Faulhammer et al. | |
| 2004/0123174 A1* | 6/2004 | Dhupar | H04J 3/0638 |
| | | | 713/401 |

FOREIGN PATENT DOCUMENTS

| | | | | |
|---|---|---|---|---|
| DE | 10104795 | | 9/2002 | |
| EP | 1837727 | | 9/2007 | |
| EP | 1 906 283 | | 4/2008 | |
| JP | 2017068353 A | * | 4/2017 | ......... G05B 19/4141 |
| WO | WO 03/100536 | | 12/2003 | |
| WO | WO-2005079402 A2 | * | 9/2005 | ............ H04J 3/0697 |

OTHER PUBLICATIONS

German Search Report dated Sep. 19, 2018 issued in corresponding German Application No. 18169487.8.

* cited by examiner

*Primary Examiner* — Kawing Chan
(74) *Attorney, Agent, or Firm* — Cozen O'Connor

(57) ABSTRACT

A method for determining an adapted master value of a master axis, wherein a setpoint slave value for a slave axis is derivable from the adapted master value via a synchronism function and a drive on the slave axis is operated in synchronism with the master axis based on the setpoint slave value, where the adapted master value is determined based on a base master value of the master axis and a time difference of operative times of determinable events on the master axis and slave axis.

29 Claims, 4 Drawing Sheets

CONTROL COMPONENT AND METHOD FOR DETERMINING AN ADAPTED MASTER VALUE OF A MASTER AXIS

BACKGROUND OF THE INVENTION

1. Field of the Invention

The invention relates to a control component and a method for determining an adapted master value of a master axis to perform a synchronism function.

2. Description of the Related Art

Process control systems, such as SIMATIC PCS 7 manufactured by Siemens, are used for automating processes in technical plants, and usually have a hierarchical structure formed by a plurality of levels. At the field level, field devices are used to detect the states of the technical process (sensors) and/or to influence the process systematically (actuators). At the control level, control processors (programmable logic controllers having CPU units) perform open-loop and closed-loop control functions in the field environment, which involves their receiving input values from the sensors, e.g., from a pressure transducer, and issuing output values to the actuators, such as to a positioner for a control valve. At the process management level, the higher-level open-loop and closed-loop control of the process is performed in process control computers.

A plurality of drive axes are involved in industrial automation in many fields of applications. By way of example, a plurality of axes should be synchronized or matched to one another to achieve a precise movement, precise processing or precise machine. In processing machines or production machines, or less commonly in machine tools and, in particular, in printing machines, two or more axes should also be matched to one another such that the synchronism is obtained. By way of example, axes operating in a synchronous group are necessary in the field of printing machines for technological problems, such as applying colors via print rolls, and cutting and folding via folding apparatuses or a flying shear in the environment of packaging machines or, in other applications, such as a cross cutter.

The idea of synchronism consists of a position of a slave axis corresponding to the best possible extent or as exactly as possible with the position of the master axis while observing the law of synchronization. Such a synchronism should be flexible, both in uniform systems, in which axes or the setpoint values, which are predetermined on the respective axes, are calculated within a controller, and in non-uniform systems in which, for example, a distributed synchronous operation is present. In the case of a distributed synchronous operation, various axes or the setpoint values thereof are calculated in various control components, which communicate via a common bus. Further, non-uniform systems can arise from different calculation clocks for different axes within a control component. Further, if there are different dynamic properties of various axes, this can also be referred to as a non-uniform system.

In the conventional solutions, setpoint values or setpoint positions at the next interpolation cycle boundary of the slave axis were previously taken into account for each synchronism function for purposes of calculating the synchronism. Here, the interpolation cycle is a cycle with which new setpoint values are calculated in each case. Accordingly, the setpoint values are output for the duration of one cycle or predetermined over one cycle. A calculated setpoint value is output over a subsequent cycle until a new setpoint value has been calculated and is present. The time at which a current interpolation cycle ends and the next interpolation cycle begins is referred to as an interpolation cycle boundary.

For applications in which axes are actuated by different control components, the cycle offsets between control components were previously ascertained with much outlay by analyzing transmitted data, adapting the master value by the cycle offset and then calculating the setpoint value of the slave axis for the next interpolator cycle clock boundary.

SUMMARY OF THE INVENTION

Against this background, it is an object of the present invention to improve the synchronism between a master axis and at least one slave axis.

This and other objects and advantage are achieved in accordance with the invention by a method for determining an adapted master value of a master axis, where a setpoint slave value for a slave axis is derivable from the adapted master value via a synchronism function and a drive on the slave axis is operated in synchronism with the master axis based on the setpoint slave value, where the adapted master value is determined based on a base master value of the master axis and a time difference of operative times of determinable events on the master axis and slave axis.

Consequently, the base master value present on the master axis is adapted to a master value associated with a different time, and this time is determined from a time difference between equivalent operative times on the master axis and on the slave axis. The operative times are in turn determined by determinable events on the master axis and slave axis.

Consequently, it is not an available base master value but an adapted master value that is used as the master value. This master value, which is adapted in time, is ascertained based on a time difference between operative times of determinable events on the master axis and on the slave axis. This means that a temporal relationship is established between the operative time of an event on the master axis and the associated operative time of the event on the slave axis. In particular, the temporal relationship is a time different, specified in a common time reference system. Arbitrary time systems are conceivable, provided both time systems correspond within the master system and the slave system or have a precisely defined relationship with respect to one another. In particular, a synchronism function for axes within the control component relates to the system time of the control component. Suitable determinable events are those events that occur on the master axis and on the slave axis. By way of example, this may relate to a setpoint value being output or an actual value being achieved on the master axis and on the slave axis.

A suitable operative time or suitable event with an associated operative time is, where possible, a time in the course of the events on the master axis and slave axis, where the course of the events comprises the output of the setpoint values and the actual values being reached on the respective axis, after which the master axis and slave axis behave as identical as possible in time. Particularly advantageously, reaching the respective actual positions is used as the operative time. However, the complete output of the setpoint values may represent a suitable operative time or a suitable event with an associated operative time, such as the dynamic behavior of master axis and slave axis, i.e., the time until the respective actual positions are reached, are the same or approximately the same.

A master value, which emerges from a movement guidance, for example, and which is predetermined by an interpolator, for example, is adapted such that a master value that is associated with a time that has been shifted by the time difference is used instead of the base master value, which is available or known.

How the base master value should be corrected, or by how much, is determined from the time difference. By way of example, the adapted master value is ascertained directly on account of the known base master value and the time difference. The time difference is then directly used, for example, to read, estimate or calculate an adapted master value. Consequently, the time difference is decisive for the adaptation, and hence decisive for the deviation of the adapted master value from the base master value. An information item about the size of the adapted master value proceeding from the base master value at a time that has been shifted by the time difference is assumed. That is, for example, the data about the master value at a time that has been shifted by the time difference are available or can be estimated or calculated. By way of example, a progress of the development of the master value over time is known or given.

Moreover, the adapted master value can be determined such that, as it were, a master value adaptation value is determined in an intermediate step. This is a value that should be subtracted from, or added to, the base master value to obtain the adapted master value. The master value correction value is also determined by means of the time difference.

An operative time should be understood to mean a time of an event that occurs on an axis. In accordance with the invention, the operative times of determinable events, which each occur on the master axis and on the slave axis, are related to one another in time such that a time difference can be ascertained. Accordingly, the determinable event on the master axis and the determinable event on the slave axis relate to associated events or an equivalent event. In particular, the event occurring on the slave axis relates to the event that is equivalent to the event occurring on the master axis. By way of example, if an actual position is reached on the master axis after the output of a setpoint master value, then the associated event on the slave axis is the actual position being reached of the setpoint slave value associated with the setpoint master value. Moreover, further events are conceivable, such as a respective actual position being reached with a shift by a time constant, in particular with a delay. Here, the time constant should be identical on both axes, in the slave axis and in that of the master axis.

In accordance with the invention, events occurring on the master axis and on the slave axis should be taken into account, where the respective operative times thereof should be compared to one another and the time difference in relation to one another should be specified in a common time reference system. This time difference is used to pre-generate the master value, as it were before the actual implementation in the synchronism function, with such an adaptation—and provide the master value on the slave axis—that it, is output in a manner adapted by the time difference. If the base master value relates to the matching master value at a time X, then the adapted master value relates to a time X+ or x− (the time difference). Consequently, the synchronism function can take into account the result of the respective axes, which are decisive for the synchronism, in advance, particularly in a continuous manner or in each interpolation cycle of the slave axis.

As a result of relating the synchronism to the time of reaching certain events, such as, in particular, reaching an actual position on the slave axis or outputting the setpoint values, and as a result of the corresponding temporal adaptation of the master value, it is possible to automatically or implicitly take into account effective communication times or different calculation clocks or interpolation cycles within systems and the influence thereof, in particular, these need not be estimated with much outlay for setpoint values belonging to the interpolation cycle boundary.

Consequently, the synchronism function, from the outset, can take into account the result that is decisive for the synchronism or of the desired end state, specifically a simultaneous adoption of an actual position or a simultaneous behavior of actual values, on the respective axes.

As a result of relating the synchronism to the time of reaching certain events, such as, in particular, an actual position being reached on the slave axis, and as a result of the corresponding temporal adaptation of the master value, it is possible to take into account effects of different communication times within systems or between various systems of various axes or of different interpolation cycles per axis or of time-shifted interpolation cycles of master axis and slave axis. As a result of the proposed method, these are implicitly taken into account by the slave axis when adapting the master value for the synchronism function.

Consequently, an increased accuracy arises for the synchronism function and, further, a higher flexibility arises when using slave axes with a temporal behavior that can deviate both from the master axis and from that of other slave axes of the same master axis.

The times until the event occurs are available on the respective axis or can be easily ascertained. By way of example, output times of setpoint values or effective output times until the actual position is reached are each ascertained. Hence, there is no need for an individual analysis of times such as the setpoint value output delay, interpolation cycle boundaries, communication times and communication preparation times, interpolator cycle clock times, other preparation times or effective output times. Instead of using the time at which the setpoint slave value should be predetermined, particularly the next interpolation cycle boundary following the calculation, as an operative time, an operative time in which the aforementioned axis-individual temporal delays have already been considered or integrated is taken into account.

For purposes of calculating the adapted master value, the base master value with an accurate time reference that is interpretable in the time system of the slave axis and the time until the operative time of the event on the slave axis, in particular, are sufficient for the slave axis as information from the master axis. Alternatively, the time (once again in a time system that is interpretable by the slave axis) of the operative time of the event on the master axis, in particular, is sufficient. By way of example, effective output times are moreover known for all involved axes, such as the master axis and the slave axis. These may take into account any components such as the setpoint value delay, communication time or axis behavior of the axes. The output times to be ascertained and to be taken into account relate to output times that elapse until the determinable event is reached. If the actual values belonging to the setpoint values are reached, then this relates, for example, to the effective output times until the actual position on the respective axis, i.e., the master axis or the slave axis, is reached in each case.

Consequently, the operative times are each calculated or known on the slave axis, in particular the operative time for the actual slave value and the operative time for the actual master value. The operative times are related to one another in the same time system, and therefore a relative temporal difference between the operative times is ascertainable.

Consequently, the time that belongs to the actual position of the master axis at the time of the actual position of the slave axis is ascertained with the setpoint value of the master axis. This time ascertained is thus now taken into account to determine the master value of the master axis on the slave axis as an adapted master value. The associated master value at this point is thus calculated as an adapted master value. The synchronism function is then performed using the adapted master value in order, in accordance with the law of synchronization, to determine and output the setpoint slave value for the next interpolation cycle boundary of the slave axis.

In accordance with an embodiment, the operative times refer to a system time that is common to the master axis and slave axis. By way of example, a global system time is used, which is known and can be ascertained in all involved systems of the involved axes. The difference between the system times is known or determinable in applications in which different system times are present in the various systems. By way of example, such a known difference between the system times, which must be taken into account, is given in the case of the distributed synchronous operation over a plurality of bus segments. As a result of such a consideration and adaptation, the operative times ultimately refer to a common system time.

In accordance with an embodiment, the common system time of the time systems of the master axis and the slave axis exists based on a common clock time. Particularly in the case where the master axis and slave axis are provided in a common control system, it is possible for a clock time to be based on this system. The specifications relating to events are linked via the operative time to this clock time and hence to the system time, or the common clock time forms the basis of the reference system of the operative times.

A system time may optionally not be provided in advance, particularly as soon as the master axis and the slave axis are embodied in different control systems, i.e., the actuation and setpoint value calculation for the respective axis is performed on different control components. Respectively existing system times are related to one another in these cases. By way of example, this is implemented for applications in which the master axis and slave axis are formed on different PROFINET segments and an establishable offset between the segments is taken into account.

In accordance with a further embodiment, a timestamp is assigned to the base master value and/or the setpoint slave value in each case and the timestamp relates to the common system time (t). A temporal relationship to one of the two system times, either that of the master axis or that of the slave axis, is provided via the timestamp. In the case of corresponding time systems or a common clock time, it is directly possible on account of the timestamp to directly relate an operative time of an event to a timestamp in both systems. In cases where the timestamp provides a time specification in relation to a time system of one of the systems, a specification of an operative time in the other system should be adapted or converted.

By way of example, the timestamp is implicitly present between master axis and slave axis in a uniform system and said timestamp relates, as a standard, to the next interpolation cycle boundary of the master axis.

Advantageously, the slave axis knows of the base master value with the associated timestamp and the times on the master axis until the determined event is reached, or the operative time of the base master value, belonging to the determined event, is directly contained in the associated timestamp and known therefrom. At this point, the operative times of equivalent events on the slave axis and master axis can be compared to one another by the slave axis taking account of a possibly present time shift between the time system of the slave axis relative to the time system of the master axis. Thus, the time difference is ascertained on the slave axis in the uniform common time system, or in the common time system that is made uniform by adaptation.

In accordance with a further embodiment, an output of the master value on the master axis and an output of the setpoint slave value on the slave axis are determined as determinable events. As a result, the times at which the setpoint values are respectively output on the master axis and on the slave axis are taken into account for the purposes of adapting the master value, and the time difference of these times is used to adapt the master value. Here, the output time of the setpoint values is the time until the setpoint values have been completely output to the motor via the subordinate drive. By way of example, when ascertaining an optimized adapted master value for a synchronism function, this, on the axes, potentially takes account of different setpoint value delays or filters in the setpoint value branch, potentially takes account of different times for the provision of the values in the servo, potentially takes account of different times in the drive until the initial output or potentially takes account of different output times of the values over an interpolation cycle length.

An improved synchronism method is thus yielded, in which a higher accuracy is achieved by calculating the operative times of the setpoint value output times on the respective axes. System-caused or procedure-caused time differences, particularly in the case of distributed synchronism applications or interpolation cycles of the master axis and slave axis with different lengths, are implicitly or automatically canceled on account of the method for adapting the master value in accordance with the disclosed embodiments.

In accordance with yet another embodiment, an actual master value being reached on the master axis and an actual slave value being reached on the slave axis are determined as determinable events.

Consequently, the actual values are taken into account, or the actual values being reached on the involved axis is taken into account to perform the synchronism function. Consequently, the synchronism is, as it were, related to the projected actual positions of the axes. This means that the master value for the subsequent interpolation cycle is adapted by the slave axis based on the operative times of the actual positions on the master axis and slave axis, and based on the time offset of these operative times. A master value adapted in this way already takes into account effects that would lead to a non-optimized master value in a synchronism application, such as on account of different effective output times in the systems of the slave axis and master axis or on account of offset interpolation cycle boundaries. By way of example, in addition to the aforementioned times, which are taken to the account when comparing the operative times of the respective setpoint value output, different delays on account of different axis behaviors or process behaviors of the axes are potentially also in taken into account when adapting the master value to be used during synchronism.

In particular, the time of reaching the actual position of the slave axis in relation to the setpoint value to be calculated in this interpolation cycle is determined by the time of the subsequent interpolation cycle boundary of the slave axis plus the time for reaching the actual position, the "effective output time", after this time.

An improved synchronism method is thus obtained, in which a higher level of accuracy is achieved by calculating the operative times of reaching the respective actual positions on the respective axes. System-caused or process-caused time differences, particularly in the case of distributed synchronism applications or differently long interpolation cycles of the master axis and slave axis, are canceled implicitly or automatically on account of the proposed method for adapting the master value. In accordance with the presently contemplated embodiment, it is even possible to take in to account time differences after the output of the respective setpoint values on the master axis and slave axis, until the respective actual position is reached and the flexibility and accuracy in synchronism applications can be increased again.

In accordance with a still further embodiment, the adapted master value is determined on the slave axis and/or on a proxy of the master axis in a system of the slave axis. By way of example, the master value is adapted in a proxy of the master axis in the system of the slave axis, with the proxy being calculated in the interpolation cycle of the slave axis before the synchronism function of the slave axis. In particular, a system of the slave axis is a uniform system. In order to maintain the system structure of the uniform system for the slave axis, the master value is realized in a proxy of the master axis and the system of the slave axis, for example, where the master value with the associated timestamp and the characteristics of the slave axis, such as interpolation cycle and at times, are known to the proxy. Mixed forms with partial calculations on the slave axis and partial calculations in the proxy are also conceivable.

In an embodiment of the method in accordance with the invention, the output of the master value on the master axis is determined on the slave axis or a proxy based on an initial time and an output time of the master axis or based on an operative time of the event of the output of the master value. The determination is implemented, in particular, on the slave axis, which undertakes the adaptation of the base master value, or a proxy of the master axis in the system of the slave axis. Consequently, the operative time of the output of the master value on the slave axis is determined.

In a further embodiment, the initial time and the output time of the master value or the operative time of the event of the output of the master value are provided on the slave axis or a proxy. The slave axis, which undertakes the adaptation of the base master value, receives the information, e.g., in a data communication, particularly via a frame, from the control axis. As described above, a proxy is understood to mean a proxy of the master axis in a system of the slave axis.

In accordance with an embodiment, the initial time and the output time of the master value or the operative time of the event of the output of the master value are contained in the timestamp of the base master value or are transmitted together with the base master value as specifications in the timestamp. Here, the initial time is specified, for example, in the common system time or with reference to the common system time or with reference to an interpolation cycle boundary of the master axis or the slave axis. The specifications in relation to the system time, provided for the slave axis, are unique, particularly in view of the semantic of the values for the slave axis.

In the case of a distributed synchronous operation, in which the slave axis and master axis are formed on different systems, such as with separate control components in each case, output times, particularly the time until the output of the setpoint values or the effective output times until the actual positions are reached, can be directly determined by a user in the slave axis or the system of the slave axis and can thus be provided in one embodiment. Alternatively, there is a co-transmission with master values in the synchronization frame or a separate transmission in the frames. In a further embodiment, it is possible for the timestamp of the setpoint master value to be modified such that it already takes into account the output time at the setpoint values on the master axis.

In accordance with a further embodiment, the actual master value being reached on the master axis is determined on the slave axis or a proxy based on an initial time and an effective output time of the master axis or based on an operative time of the event of the actual position being reached on the master axis. In particular, determination is implemented on the slave axis that undertakes the adaptation of the base master value.

In accordance with an embodiment, the initial time and the effective output time of the master axis or the operative time of the event of the actual position being reached on the master axis are provided on the slave axis or a proxy. The slave axis, which undertakes the adaptation of the base master value, receives the information, e.g., via a frame, from the control axis. The effective output time of the master axis is co-transmitted, e.g., in a frame, for each master value adaptation, particularly for variable or varying effective output times of the master axis. As described above, a proxy is understood to mean a proxy of the master axis in a system of the slave axis.

In accordance with a further embodiment, the initial time and the effective output time of the master axis or the operative time of the event of the actual position being reached on the master axis are contained in the timestamp of the base master value or these are transmitted as specifications in a timestamp, together with the base master value.

In accordance with a further embodiment, the output of the setpoint slave value on the slave axis is ascertained based on an initial time associated with the calculation time, particularly a next interpolation cycle boundary, and an output time for the output of the setpoint slave value. Consequently, the operative time of the output of the setpoint slave value is ascertained, the ascertained setpoint slave value then being compared to the analogous operative time on the master axis.

The output of the setpoint slave value is ascertained on the slave axis or on a proxy of the master axis in the system of the slave axis. As described above, a proxy is understood to mean a proxy of the master axis in a system of the slave axis. By way of example, the proxy is calculated in the interpolation cycle of the slave axis before the synchronism function of the slave axis. To this end, the proxy knows of the output time of the setpoint values of the slave axis.

In accordance with a still further embodiment, the actual slave value being reached on the slave axis is determined based on an initial time associated with the calculation time, particularly a next interpolation cycle boundary of the slave axis, and an effective output time of the slave axis.

Reaching the actual slave value is established on the slave axis or on a proxy of the master axis in the system of the slave axis. By way of example, the proxy is calculated in the interpolation cycle of the slave axis before the synchronism function of the slave axis. To this end, the proxy knows of the effective output time of the slave axis until the actual values are reached.

The two output times are respectively taken into account for reaching the actual master value and the actual slave value, particularly for different output times of the master axis and the slave axis. In applications or systems where the temporal length of the output time of the master axis corresponds to the temporal length of the output time of the slave axis, it is possible to dispense with the output times being taken into account in each case. Then, the same temporal influencing factors on the two axes do not play any role for ascertaining the time difference. In one embodiment, taking the respective output times into account is optionally activatable and/or deactivated in a program procedure on the slave axis for the purposes of determining the adapted master value.

As soon as the interpolation cycles or calculation clocks of the master axis and slave axis differ, the output times are different as well because the setpoint values at the interpolator cycle clock boundary are output over the subsequent cycle and can only be reached then, too. Taking account of the respective output times should then be activated for these applications.

In accordance with a further embodiment, the base master value and the adapted master value have a master value position or a master value position and a master value speed.

The master value position and master value speed values and, optionally, the master value acceleration are typically transmitted via the frame for the purposes of determining the master value.

In accordance with a further embodiment, the base master value associated with an initial time of the master axis is corrected by virtue of the adapted master value being determined at a time that, proceeding from the initial time of the master axis, is shifted by the time difference. The phrase "shifted in time" can mean a shift in both directions in this case, going forward in time or going back in time, proceeding from the initial time. Here, as a rule, the initial time is the interpolation cycle boundary, with respect to which the master axis calculates the setpoint master value. In accordance with an embodiment, the adapted master value for the time shifted by the time difference proceeding from the initial time of the master axis is extrapolated or interpolated proceeding from the base master value. That is, the adapted master value underlying the synchronism calculation is determined such that it is established on account of available master values with the associated times and based on a master value curve arising from the known master values. Conventional interpolation and extrapolation methods are used in the process.

There is an extrapolation in cases where a master value associated with the subsequent time is intended to be output in order to achieve a better correspondence, i.e., a correspondence that is simultaneous as possible, when the respective events are reached on the respective axes. In the simplest approach, the extrapolation is implemented by way of the speed being multiplied by the difference time. The adapted setpoint position setpoint value, for example, is obtained thus. An interpolation is performed in cases where the master value should be adapted on account of the calculation such that the adapted master value should be ascertained at a time that has been shifted forward by the time difference when proceeding from the initial time.

In particular, the extrapolation or interpolation is implemented taking into to account the master value speed and, optionally, additionally taking into account the master value acceleration. Optionally, an extrapolation time or interpolation time, which should be taken into account in an additive manner, is additionally implemented. Here, the extrapolation time or interpolation time should be taken into account on account of the time delay by the calculation of the adapted master value on the slave axis.

In accordance with a further embodiment, the adapted master value is ascertained as a master value that should be applied until the next interpolation cycle boundary of an interpolation cycle of the slave axis. The slave axis calculates the adapted master value such that it is applied in the synchronism function in an optimized manner, or is incorporated in the synchronism function, until the next interpolation cycle boundary of the slave axis. Here, in particular, the initial time of the master axis, i.e., for example, the interpolation cycle boundary of the master axis for which the master axis has output the master value, is irrelevant to the slave axis and, in particular, not known either.

In accordance with a further embodiment, the respective drives of the slave axis and the master axis, or of the slave axis and a further slave axis of the master axis, are operated in synchronism with one another. Advantageously, an adapted master value can be ascertained for each slave axis of a plurality of slave axes, which are assigned to a master axis, using the above-described method in accordance with disclosed embodiments. Individual output times or effective output times or interpolation cycle differences or time offsets of the time system relative to the main axis can be taken into account individually for each slave axis.

It is also an object of the invention to provide a control component for controlling a drive of a slave axis on the basis of master values of a master axis, which is configured to perform the method in accordance with the disclosed embodiments. The synchronism method or the synchronism function is advantageously calculated on a control component for controlling the slave axis.

In accordance with one embodiment, a control component for controlling a drive of the master axis has a separate embodiment and the control components communicate with one another via a bus connection.

This yields advantageous applications for a distributed synchronous operation, in which the synchronized axes are distributed among a plurality of components. The bus connection can be used to transmit effective output times in the case of a distributed synchronous operation, or these are already taken into account in the transmitted timestamp. If a plurality of control components for a real-time-capable communication are connected on the same bus segment, for example a PROFINET-IRT on the same bus segment, the PROFINET-IRT structure already provides a common system time. In the case of a distributed synchronous operation, the timestamp transmitted in the frame advantageously has, as a basis, the common system time for such applications. The difference between the system times of the segments should be taken into account in applications of the distributed synchronous operation over a plurality of bus segments.

In accordance with one embodiment, the control component is simultaneously formed to control a drive of the master axis. By way of example, for a synchronism with identical control components for master axis and slave axis, the advantages that, on account of the common time reference, optimization can be performed with respect to, for example, actual positions being reached simultaneously on the master and slave axis furthermore arise on account of provided different or non-synchronized interpolation cycles. Additionally, the optimized master value calculation is not dependent on bidirectional communication between the master axis and the slave axis. Instead, the slave axis can itself undertake the optimization based on data about the master axis from unidirectional communication of the master axis.

Advantageously, the disclosed embodiments of the method and the associated control unit facilitate an adaptation of a master value for a synchronism function, to be used on the slave axis such that, particularly when the actual position of the master axis is reached, the actual position of the slave axis is likewise approached as simultaneously as possible to the best possible extent, in accordance with the law of synchronization. The effects occurring on the respective axis which lead to an individual delay in the actual value being reached, for example, have only occurred once. Consequently, the actual position on the respective axis is reached. These are also, at the same time, already taken into account in the synchronism algorithm if the temporal coincidence of the operative times of reaching the actual position on the slave axis and master axis is predetermined as a condition in order to calculate and predetermine the suitable master value for an interpolation cycle of the slave axis.

Consequently, the temporal coincidence of the events of reaching the actual position on the master axis and of reaching the actual position on the slave axis in a common system time is made a condition in order to calculate, backwards as it were, how the master value provided on the master axis should be adapted in time on the slave axis before the synchronism function is performed so that the condition is satisfied to the best possible extent. In a forward calculation, as it were, the respective operative time of the event, which is chosen for the optimization, is calculated in the common system time to ascertain the time difference between the occurrence of the respective events. In the backward direction, as it were, this time difference is then applied to adapt the available base master value such that it belongs to the time that has been shifted by the time difference. If this yields that the event on the slave axis occurs at a later time than the event on the master axis, then the master value should be extrapolated. By contrast, the adapted master value should be adapted via an interpolation if it emerges that the operative time of the event on the master axis occurs later in time than the operative time of the event on the slave axis.

Advantageously, interpolation cycles of the master axis and of the slave axis consequently need not be synchronized with respect to one another and, in the case of a plurality of slave axes, there may be a different step up or step down of the slave axis interpolation cycle in relation to the master axis interpolation cycle.

The base master value can also be referred to as a formal master value with a time reference.

Advantageously, the disclosed embodiments of the method are applicable to distributed synchronous operation, in which the exchange about master and actual values is implemented by way of bidirectional frames. Particularly advantageously, the disclosed embodiments of the method can also be used if only unidirectional frames or broadcast frames are sent. By way of example, all the information required to calculate the adapted master value are present on the slave axis on account of the predetermined master value with the associated timestamp and, optionally, with further data such as output times, as described above. This facilitates a simplified synchronism method, particularly in the case of many slave axes. Effects that lead to the delay or to the falling apart of the uniformly set operative times of the events at master and slave axes are already taken into account in the synchronism algorithm. As a result, even a frame outage is harmless.

The method is usable both for applications of real master axes and in virtual master axes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

With the aid of the figures, the invention will be explained in more detail below on the basis of exemplary embodiments, in which.

DETAILED DESCRIPTION OF THE EXEMPLARY EMBODIMENTS

Functionally equivalent elements have been provided with the same reference sign in the figures, provided nothing else is specified.

Figure 1:
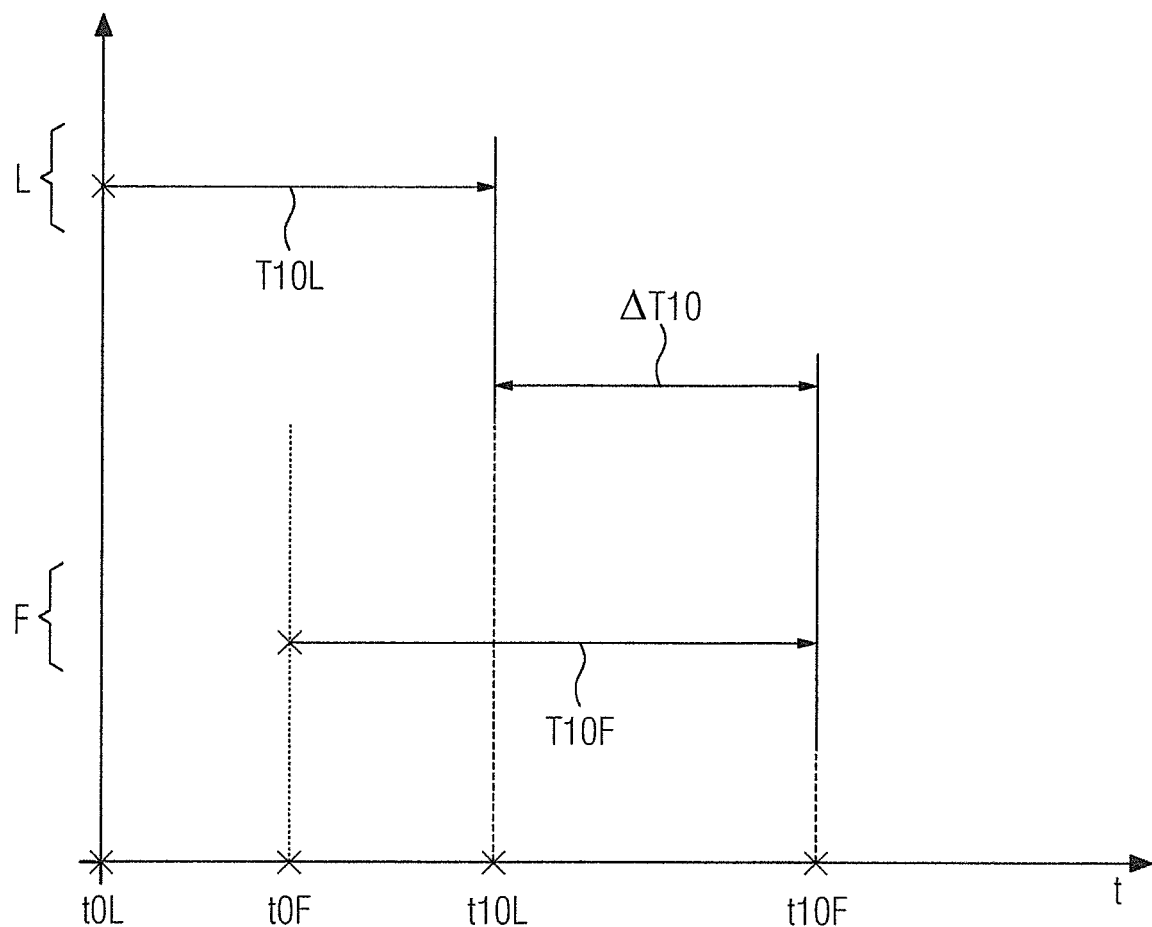
FIG. 1 shows an exemplary schematic illustration for elucidating relative temporal relationships of variables established for the calculation of an adapted master value in accordance with a first embodiment of the invention.

FIG. 1 represents events and times of these events, which are used for determining an adapted master value in accordance with a first exemplary embodiment of the invention, in a time diagram. Here, the horizontal axis indicates a system time t, which is a common system time shared by a master axis L and the slave axis F. That is, the master axis L and slave axis F use a common system time t. By way of example, a first control component is provided for controlling the master axis L and a second control component is provided for controlling the slave axis F. The events that are related to one another in time are plotted in the upper half of the diagram for the master axis and in the lower half for the slave axis. A common system time t, to which calculations in the master axis L and in the slave axis F and to which the specification of setpoint values both systems relate, is available via a PROFINET-IRT communication within a bus segment.

A master value leading to an actual master value being assumed via the control component is output as setpoint master value by the master axis L at an initial time t0L. Consequently, the interpolator cycle clock boundary of the master axis lies at t0L, for which interpolator cycle clock boundary the setpoint value is calculated on the master axis.

The latter is output over an output time T10L and, after a process time, it leads to the actual position on the master axis.

Consequently, the setpoint value is output at the time t10L. This time is the operative time t10L of the output of the setpoint value on the master axis.

The slave axis calculates the slave setpoint value at a subsequent interpolation cycle of the slave axis F. For an interpolation cycle boundary t0F of this interpolation cycle, the slave axis F predetermines, via a synchronism function, a setpoint slave value in relation to the base master value output by the master axis.

The interpolation cycle boundary t0F, at which the slave axis F calculates setpoint values, is shifted by an undefined time that emerges from the communication times and/or different interpolator cycle clock times.

The calculation of the operative time t10F of outputting the setpoint slave value is then implemented on the slave axis F.

Proceeding from the interpolation cycle boundary t0F, the effective time of the output of the setpoint slave value t10F can be ascertained by virtue of the known output time of the slave axis T10F being added. After this time interval of the output time of the slave axis T10F, the event, which is used for the master value adaptation in accordance with the first exemplary embodiment, has occurred on the slave axis. This operative time of the output of the setpoint slave value t10F is now compared in the uniform time system t to the operative time of the output of the setpoint master value t10L and, in particular, the difference between these two times is ascertained. This yields the time difference ΔT10.

The sign of the result in this subtraction yields the shift of the master value on the time axis, either forward or backward in time.

The time difference ΔT10 is now used to calculate an adapted master value that belongs to the time that has been shifted by the time difference ΔT10 proceeding from the initial time t0L. This adapted master value is the master value that advantageously should be used by the slave axis in relation to its interpolation cycle boundary t0F for the synchronism function.

For the proposed method in accordance with the invention, the interpolation clocks on the master and slave axis are not necessarily matched to one another or synchronized or of equal length. On account of the reference to the common system time, the adaptation of the master value by the slave axis via the calculation step of the operative points of analogous events on the slave axis and master axis is not dependent on a known or ascertainable or fixed temporal reference of the respective interpolation cycles and their boundaries. This facilitates a precise synchronism, even for distributed synchronous operation with different interpolation cycles or interpolation cycles of the slave axis and the master axis that have an undetermined temporal relation with respect to one another.

Figure 2:
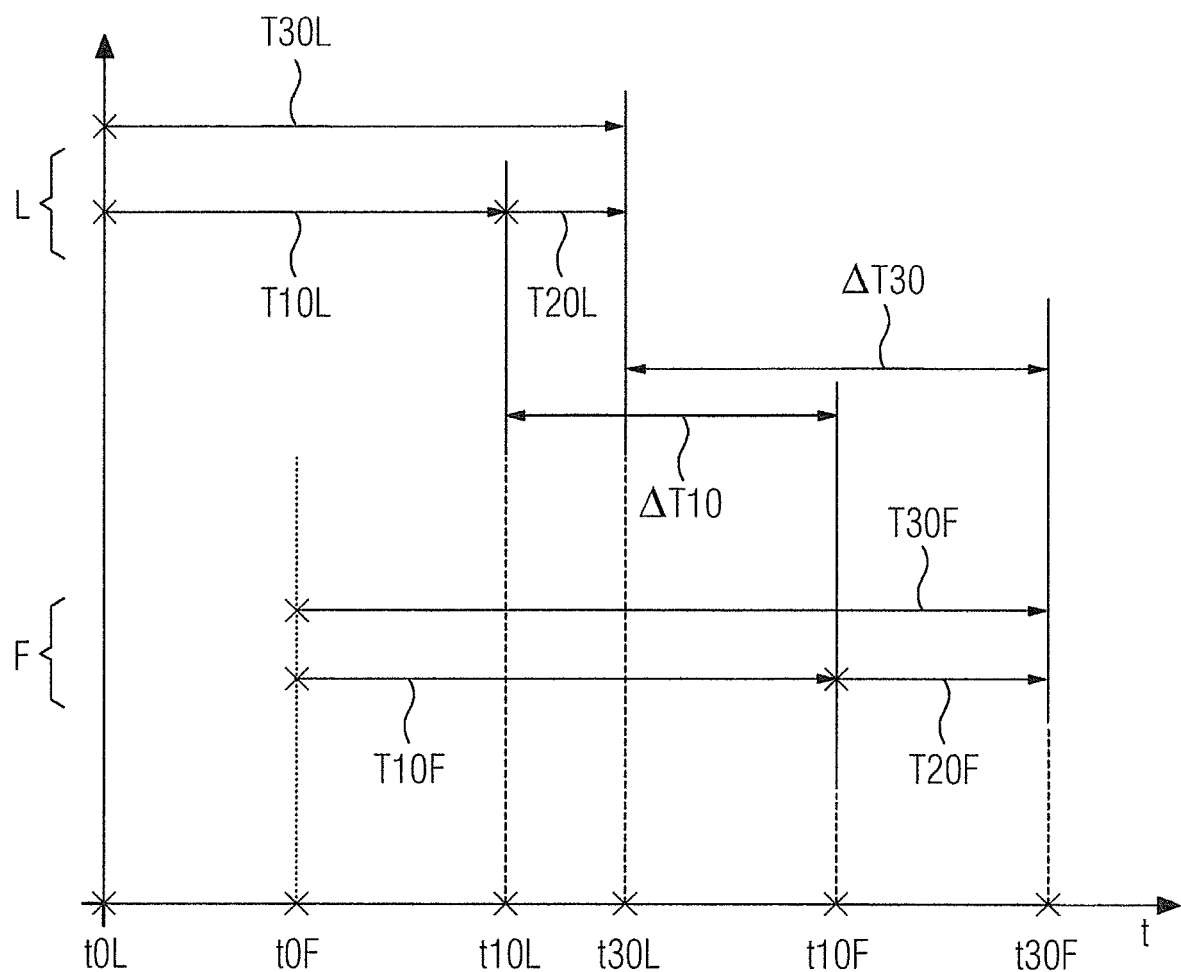
FIG. 2 shows an exemplary schematic illustration for elucidating relative temporal relationships of variables established for the calculation of an adapted master value in accordance with a second embodiment of the invention.

FIG. 2 elucidates the adaptation of the master value in accordance with a second exemplary embodiment of the invention, which takes into account the respective actual positions being reached on the master axis and slave axis.

For an improved understanding, additional characteristic times and time intervals to be established for the second exemplary embodiment have also been plotted into the diagram of FIG. 1.

Following the time t10L, at which the base master value is output, the time interval T20L is plotted in the upper half of the diagram on the master axis, where the time interval elapses until the actual position was adopted on the master axis L. The operative time of reaching the actual position on the master axis is denoted by the sign t30L. An effective output time T30L until the actual position is adopted on the master axis after the interpolation cycle boundary of the master axis is therefore composed of, in particular, the output time of the master value T10L and the time interval T20L until the actual position is reached after the master value is output.

The value of the operative time of the actual position on the master axis t30L is ascertained by the slave axis from, for example, a frame of the master axis, or the slave axis calculates the value from specifications relating to the interpolation cycle boundaries of the master axis and setpoint output times or the effective output time of the actual values, which are or were provided either by the master axis directly or by a user.

Analogously, the operative time of the actual position being reached is ascertained for the setpoint value to be calculated in the current interpolation cycle for the next interpolation cycle boundary of the slave axis. To this end, for example, the effective output time T30F of the actual values is known on the slave axis. Proceeding from the interpolation cycle boundary t0F, which is known in the time system of the slave axis, the operative time of the actual position t30F being reached is thus ascertained. Here, the effective time of reaching the actual position t30F being calculated in a piecewise manner from the output time of the setpoint values T10F and a time interval T20F until the actual values are reached after the output of the setpoint values t10F is also conceivable in one embodiment of the method.

The temporal distance ΔT30 of the two operative times of the intended values being reached at the respective axes t30L and t30F is subsequently used to adapt the master value. There is an extrapolation of the base master value on the slave axis in the first and in the second exemplary embodiment. Consequently, a master value following in time as adapted master value is used as master value that is optimized for the synchronism function.

The method for calculating the adapted master value consequently takes into account the communication times for the master value transmission and effective output times on the respective axes in the case of a distributed synchronous operation. The respective output times of the setpoint values or the effective output times until the actual values are reached can be caused by different interpolation cycle lengths or by respective times for providing the values in the servo or by required times in the drive until the output start or by setpoint value output delay times set on an axis or by setpoint value filter times in the setpoint value branch for adapting the dynamics or by different communication times of the axes to the drive or by an individually different process behavior of the axes in the case of a set feedforward control or without a feedforward control or by further adjustable times.

The base master values output by the master axis L can be adapted for further slave axis F' (not illustrated). This can be implemented on the further slave axis F' in the same way and independently of the adaptation of the slave axis F.

The further slave axis F' can also ascertain the adapted master value therefor, provided the information about the master axis data are present. Consequently, the master value can be optimized individually for each slave axis F, F' in a particularly advantageous manner, precisely in the case of a distributed synchronous operation with a plurality of slave axes and so, for example, the respective times of reaching the actual positions on the slave axes F coincide in comparison with the master axis L and the further slave axis F' coincide in comparison with the master axis L, and hence also coincide with overall optimization. Here, the respective time difference that is ascertained for calculating the adapted master value may differ for the slave axis and a further slave axis F', i.e., may have a different length or temporal length or even a different sign, and so the adaptation of the master value for each slave axis can be implemented individually in each case, before it or in time. This means that the adapted master value can be adapted via an extrapolation or interpolation, particularly in a different manner for each slave axis. Here, the improved master value calculation on part of the slave axis and the flexibility in the case of a distributed synchronous operation with a plurality of slave axes becomes particularly clear.

Depending on the field of use of the synchronism function, extrapolations of the master values or interpolations of the master values tend to be expected. For applications that require a particularly high accuracy of the synchronism, the master axes operate with setpoint value output delays, for example, and consequently accept delays in order then to be able to apply an interpolation of the master value on the slave axes. The interpolation is supported by master values that have already been recorded, and so an output of a setpoint slave value can be implemented with a high accuracy, albeit with a delay. For applications such as for printing machines, for example, this is particularly advantageous.

In other applications, such as for packaging applications in which a short reaction time is required, a reduced accuracy on the slave axis, caused by an extrapolation of the master value, tends to be accepted for the benefit of a short reaction time.

In the comparison with the aid of FIG. 2, which contains both embodiments in the same diagram, the two exemplary embodiments show that, depending on the employed system and axes that should be operated in synchronism, deviations may again arise on the various axes up to the operative times of reaching the respective actual values t30L and t30F, even after the operative times of outputting the setpoint values at the respective axes t10L and t10F. Expressed differently, it is possible to see that it is not only the output times of the setpoint values T10L and T10F that deviate from one another, but also the time intervals T20L and T20F that elapse until the actual values are reached after the setpoint values have been output. Therefore, it may be particularly expedient in applications to set reaching the actual position on the respective axis as a relevant event for the purposes of forming the time difference. The output of the setpoint values can be used as a relevant event in applications in which, for example, the time intervals T20L and T20F for the master axis and the slave axis, which are initially of unequal length, can be actively compensated such that both take the same amount of time by way of delays in one of the axes.

Figure 3:
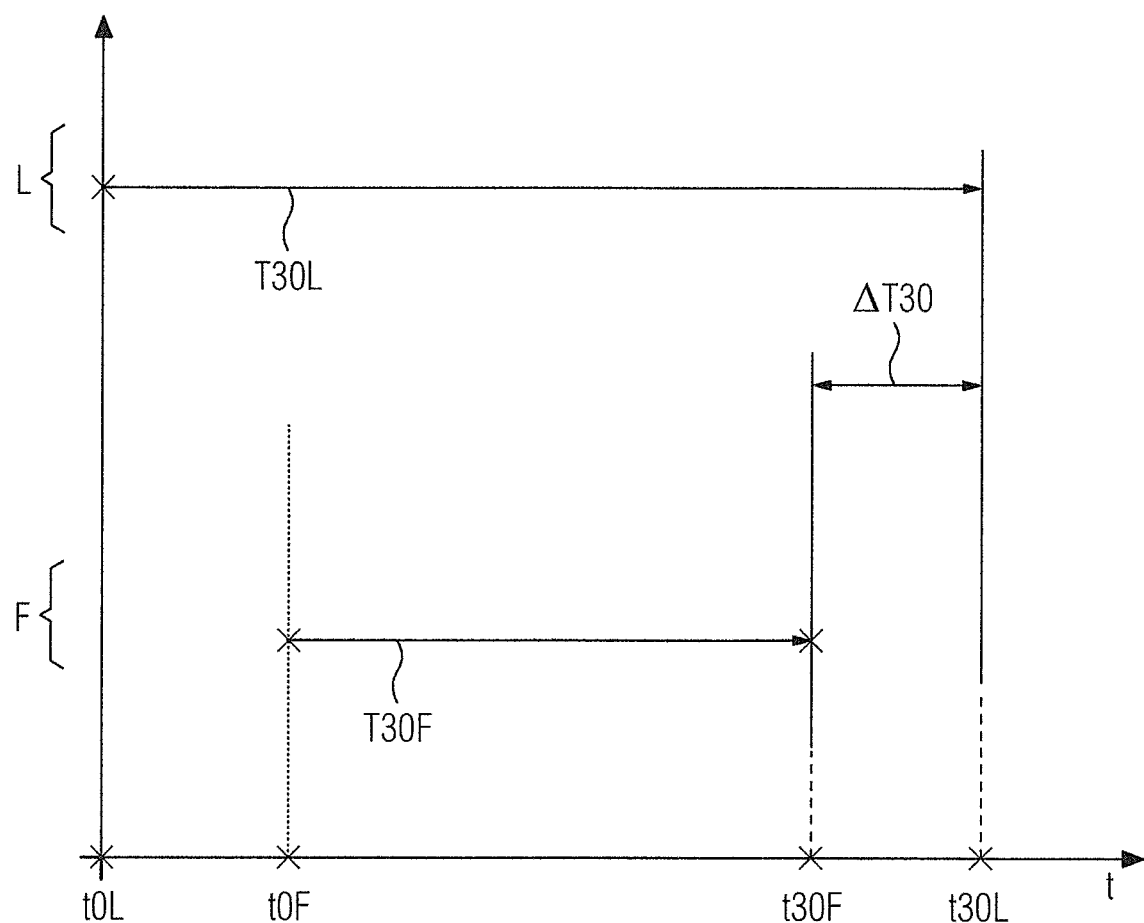
FIG. 3 shows an exemplary schematic illustration for elucidating relative temporal relationships of variables established for the calculation of an adapted master value in accordance with a third exemplary embodiment of the invention.

FIG. 3 illustrates a time diagram for a third exemplary embodiment, in which the actual position on the master axis is reached later in time than the actual position being reached on the slave axis. The time difference $\Delta T30$ is likewise determined for such a case. This time difference $\Delta T30$ leads to the adaptation of the master value by interpolation. That is, the slave axis uses an adapted master value, which belongs to an earlier time than the base master value, to perform the synchronism function at the next interpolator cycle clock boundary.

Figure 4:
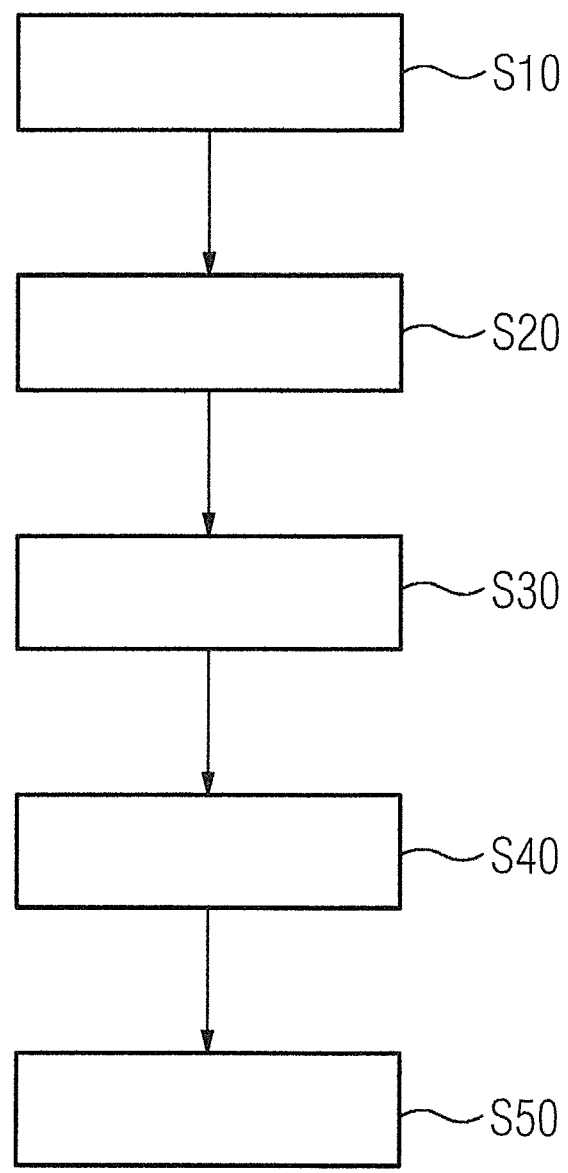
FIG. 4 shows an exemplary schematic illustration of a method procedure for adapting the master value in accordance with a fourth embodiment of the invention.

FIG. 4 schematically shows a flowchart of the method steps to be performed on the slave axis in accordance with a fourth exemplary embodiment of the invention. By way of example, the operative time of the relevant event on the slave axis is calculated, as indicated in step S10. The latter is not already determined via the time of the interpolation cycle boundary but should be ascertained, as described above, by the addition of further time intervals. In a second step S20, the time of the relevant event on the master axis is calculated on part of the slave axis. This time of the operative time is known by way of the timestamp provided along with the base master value or by way of additional data in relation to the timestamp, should it not be directly contained in this timestamp. Method steps S10 and S20 can be performed in any order.

Subsequently, the time difference $\Delta T10$ or $\Delta T30$ is calculated, as indicated in step S30. This time difference will be ascertained (with reference to the reference signs of FIG. 2) based on the absolute time values t10L and t10F or t30L and T30F in the common time system t, with a reference time, such as a common interpolation cycle boundary of both axes in particular, not being required.

The master values are adapted in a fourth step S40. There is a conversion of the base master value, which belongs to the initial time t0L, to the master value that belongs to the time has been shifted by the time difference $\Delta T10$ or $\Delta T30$.

Thereupon, the fifth step S50 is still performed in a synchronism application. Here, the synchronism function is applied to the adapted master value to determine the best suited setpoint slave value that leads to a synchronism between the master axis and slave axis with a particularly good correspondence.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining an adapted master value of a master axis in an industrial automation system to increase an accuracy of a translation of a movement within the industrial automation system, the method comprising:
   operating a drive on a slave axis in synchronism with the master axis based on a setpoint slave value calculated for a subsequent interpolation cycle of the slave axis, said setpoint slave value being derivable from the adapted master value and being in relation to a base master value output by the master axis;
   determining the adapted master value based on the base master value of the master axis and a time difference of operative times of determinable events on the master axis and slave axis, said operative times comprising a system time which is common to the master axis and slave axis; and
   operating the industrial automation system based on the adapted master value such that the accuracy of the translation of the movement within the industrial automation system is increased.

2. The method as claimed in claim 1, wherein the system time of time systems of the master axis and the slave axis exists or is establishable based on a common clock time.

3. The method as claimed in claim 2, wherein a timestamp is assigned to at least one of (i) the base master value and (ii) the setpoint slave value in each case, and the timestamp relates to the system time.

4. The method as claimed in claim 1, wherein a timestamp is assigned to at least one of (i) the base master value and (ii) the setpoint slave value in each case, and the timestamp relates to the system time.

5. The method as claimed in claim 1, wherein an output of the master value on the master axis and an output of the setpoint slave value on the slave axis are determined as determinable events.

6. The method as claimed in claim 5, wherein an output of the master value on the master axis is determined on the slave axis or a proxy based on one of (i) an initial time and an output time of the master axis and (ii) an operative time of an event of the output of the master value.

7. The method as claimed in claim 6, wherein one of (i) an initial time and an output time of the master value are provided on the slave axis or the proxy and (ii) the operative time of the event of the output of the master value is provided on the slave axis or the proxy.

8. The method as claimed in claim 7, wherein one of (i) the initial time and the output time of the master value are contained in a timestamp of the base master value or transmitted as data in a timestamp together with the base master value and (ii) the operative time of the event of the output of the master value is contained in a timestamp of the base master value or transmitted as data in a timestamp together with the base master value.

9. The method as claimed in claim 8, wherein the output of the setpoint slave value on the slave axis is determined based on an initial time associated with a calculation time comprising a next interpolation cycle boundary of the slave axis, and an output time for outputting the setpoint slave value.

10. The method as claimed in claim 7, wherein the output of the setpoint slave value on the slave axis is determined based on an initial time associated with a calculation time comprising a next interpolation cycle boundary of the slave axis, and an output time for outputting the setpoint slave value.

11. The method as claimed in claim 6, wherein the output of the setpoint slave value on the slave axis is determined based on an initial time associated with a calculation time comprising a next interpolation cycle boundary of the slave axis, and an output time for outputting the setpoint slave value.

12. The method as claimed in claim 5, wherein the output of the setpoint slave value on the slave axis is determined based on an initial time associated with a calculation time comprising a next interpolation cycle boundary of the slave axis, and an output time for outputting the setpoint slave value.

13. The method as claimed in claim 1, wherein an actual master value being reached on the master axis and an actual slave value being reached on the slave axis are determined as determinable events.

14. The method as claimed in claim 13, wherein an actual master value being reached on the master axis is determined on the slave axis or a proxy based on one of (i) an initial time and an effective output time of the master axis and (ii) an operative time of an event of an actual position being reached on the master axis.

15. The method as claimed in claim 14, wherein one of (i) the initial time and the effective output time of the master axis are provided on the slave axis or the proxy and (ii) the operative time of the event of the actual position being reached on the master axis is provided on the slave axis or the proxy.

16. The method as claimed in claim 15, wherein one of (i) the initial time and the effective output time of the master axis are contained in a timestamp of the base master value or transmitted as data in a timestamp together with the base master value and (ii) the operative time of the event of the actual position being reached on the master axis is contained in a timestamp of the base master value or transmitted as data in a timestamp together with the base master value.

17. The method as claimed in claim 16, wherein the actual slave value being reached on the slave axis is determined based on an initial time associated with a calculation time comprising a next interpolation cycle boundary of the slave axis, and an effective output time of the slave axis.

18. The method as claimed in claim 15, wherein the actual slave value being reached on the slave axis is determined based on an initial time associated with a calculation time comprising a next interpolation cycle boundary of the slave axis, and an effective output time of the slave axis.

19. The method as claimed in claim 14, wherein the actual slave value being reached on the slave axis is determined based on an initial time associated with a calculation time comprising a next interpolation cycle boundary of the slave axis, and an effective output time of the slave axis.

20. The method as claimed in claim 13, wherein the actual slave value being reached on the slave axis is determined based on an initial time associated with a calculation time comprising a next interpolation cycle boundary of the slave axis, and an effective output time of the slave axis.

21. The method as claimed in claim 1, wherein the adapted master value is determined on at least one of (i) the slave axis and (ii) a proxy of the master axis in a system of the slave axis.

22. The method as claimed in claim 1, wherein the base master value and the adapted master value have a master value position or a master value position and a master value speed.

23. The method as claimed in claim 1, wherein the base master value associated with an initial time of the master axis is corrected by virtue of the adapted master value being determined at a time that, proceeding from the initial time of the master axis, is shifted by the time difference.

24. The method as claimed in claim 23, wherein the adapted master value for the time shifted by the time difference proceeding from the initial time of the master axis is extrapolated or interpolated proceeding from the base master value.

25. The method as claimed in claim 1, wherein the adapted master value is ascertained as a master value to be applied up to a next interpolation cycle boundary of an interpolation cycle of the slave axis.

26. The method as claimed in claim 1, wherein respective drives of one of (i) the slave axis and the master axis and (ii) the slave axis and a further slave axis of the master axis are operated in synchronism with one another.

27. A controller which controls a drive of a slave axis based on master values of a master axis in an industrial automation system to increase an accuracy of a translation of a movement within the industrial automation system, wherein the controller is configured to:
operate the drive of the slave axis in synchronism with the master axis based on a setpoint slave value calculated for a subsequent interpolation cycle of the slave axis, said setpoint slave value being derivable from an adapted master value and being in relation to a base master value output by the master axis;
determine the adapted master value based on the base master value of the master axis and a time difference of operative times of determinable events on the master axis and slave axis, said operative times comprising a system time which is common to the master axis and slave axis; and
control the industrial automation system based on the adapted master value such that the accuracy of the translation of the movement within the industrial automation system is increased.

28. The controller as claimed in claim 27, wherein a further controller which controls a drive of the master axis has a separate embodiment and the controller and the further controller communicate with one another via a bus connection.

29. The control component as claimed in claim 27, wherein the controller simultaneously controls a drive of the master axis.

* * * * *